United States Patent
Sharp et al.

[11] Patent Number: 5,946,946
[45] Date of Patent: Sep. 7, 1999

[54] SUSPENSION SYSTEM FOR AN AUTOMATIC WASHING MACHINE

[75] Inventors: Brenner M. Sharp, St. Joseph; Sylvan J. Amos, Kalamazoo; Casey J. Tubman, St. Joseph, all of Mich.

[73] Assignee: Whirlpool Corporation, Benton Harbor, Mich.

[21] Appl. No.: 08/964,251

[22] Filed: Nov. 4, 1997

[51] Int. Cl.[6] .................................................. D06F 37/24
[52] U.S. Cl. ......................... 68/23.1; 188/129; 188/381; 248/638; 267/203
[58] Field of Search ................................ 68/23.1, 23.3; 188/129, 381; 267/202, 203; 248/638

[56] References Cited

U.S. PATENT DOCUMENTS

| | | | |
|---|---|---|---|
| 3,031,034 | 4/1962 | Thomas | 188/1 |
| 3,306,082 | 2/1967 | Hasegawa et al. | 68/12 |
| 3,744,746 | 7/1973 | Weir et al. | 248/18 |
| 3,866,724 | 2/1975 | Hollnagel | 188/129 |
| 4,343,452 | 8/1982 | Bauer | 248/565 |
| 4,537,382 | 8/1985 | Beck | 248/568 |
| 4,934,493 | 6/1990 | Bauer et al. | 188/381 |
| 4,955,467 | 9/1990 | Kallenbach | 188/381 |
| 5,080,204 | 1/1992 | Bauer et al. | 188/129 |
| 5,117,659 | 6/1992 | Sharp et al. | 248/568 |
| 5,295,564 | 3/1994 | Stadelmann | 188/381 |
| 5,549,182 | 8/1996 | Ehrnsberger et al. | 188/129 |
| 5,606,879 | 3/1997 | Froelicher et al. | 68/23.3 |

FOREIGN PATENT DOCUMENTS

| | | | |
|---|---|---|---|
| 0054274 | 5/1977 | Japan | D06F 37/24 |
| 0018198 | 1/1985 | Japan | D06F 37/24 |
| 0185588 | 9/1985 | Japan | D06F 37/24 |
| 1025594 | 2/1986 | Japan | D06F 37/24 |
| 2122698 | 6/1987 | Japan | D06F 37/24 |
| 2092396 | 4/1990 | Japan | D06F 37/24 |

*Primary Examiner*—Philip R. Coe
*Attorney, Agent, or Firm*—Robert O. Rice; Joel M. Van Winkle; Thomas J. Roth

[57] ABSTRACT

A suspension rod assembly for a resiliently supporting a moving system of a washing machine. The suspension rod assembly includes a rod having an upper end engaging a stationary support structure and a lower end. An end cap including a washer and an annular retainer is mounted to the lower end of the rod. A friction tube is disposed about the lower portion of the rod and has a flanged bottom edge captured between the annular retainer and the washer. The friction tube extends upwardly from the end cap about the rod and a tubular cup is provided about the friction tube. The cup includes a cylindrical wall forming an elongated annular cavity between the friction tube and the cylindrical wall. A compressible friction member is disposed within the elongated annular cavity and is radially compressed between the cylindrical wall and friction tube for frictionally engaging the friction tube. The compressible friction member is formed from a rectangular sheet of foam material which is wrapped about the friction tube such that it is configured into a hollow cylindrical body having an axial gap or slit. A spring is arranged coaxially around the friction tube between the end cap and tubular cap. A cap mounts above the open top end of the tubular cup for capturing the compressible friction member between the cap and the tubular cup. The cap supportably engages the moving system of the washer such that suspension rod assembly resiliently supports the moving system.

11 Claims, 3 Drawing Sheets

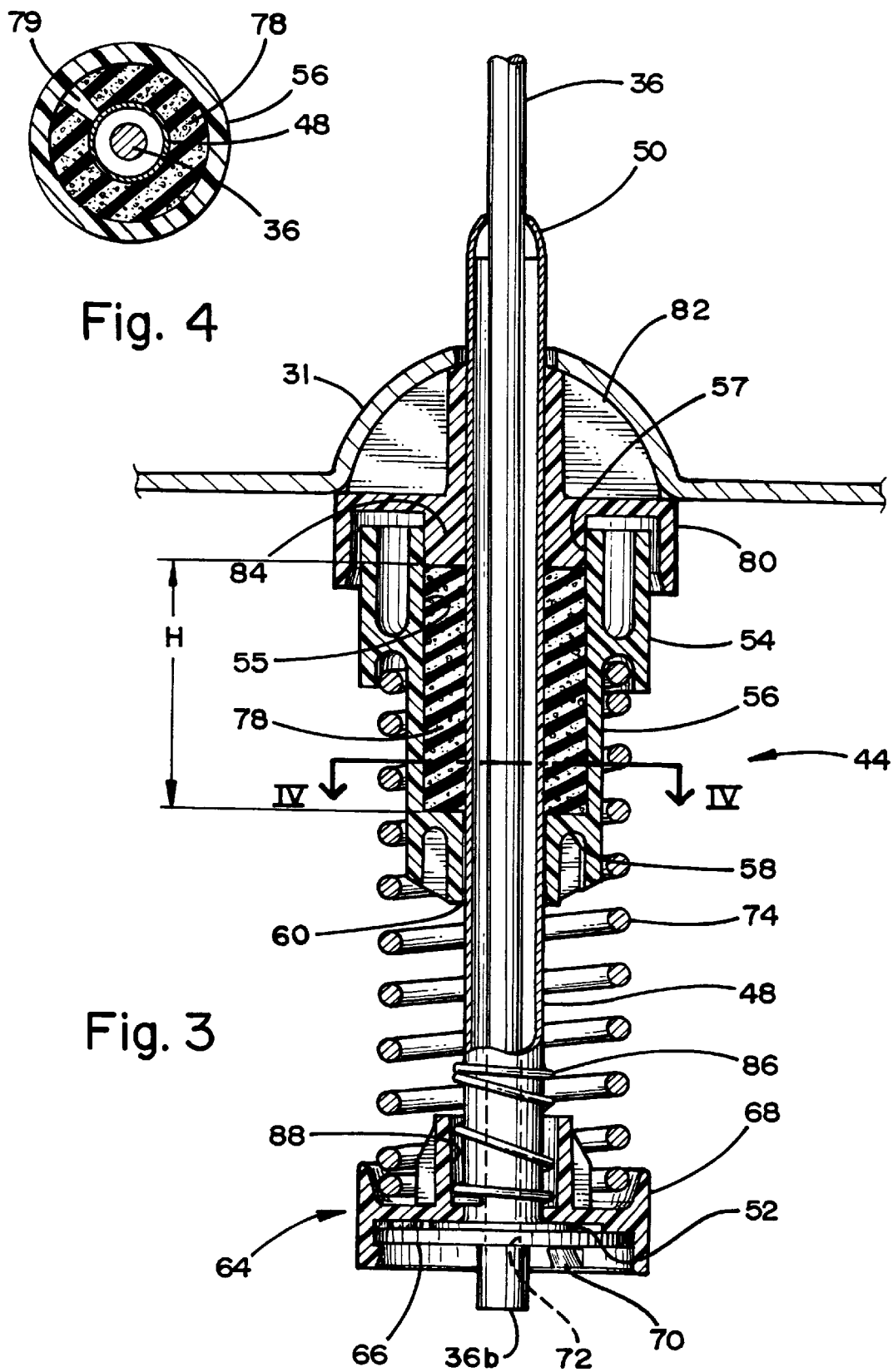

SUSPENSION SYSTEM FOR AN AUTOMATIC WASHING MACHINE

BACKGROUND OF THE INVENTION

1. Field of Invention

The present invention relates generally to a suspension system for an automatic washer and more particularly to an improved system for damping the movement of a washer having a hung suspension system.

2. Description of Related Art

Hung suspension type automatic washers typically employ suspension rod assemblies for suspending a moving system, normally including a floating frame which supports a tub to hold water, a basket within the tub to hold the clothes to be washed and a drive system. The moving system is supported by a stationary support structure, normally the outer cabinet or frame of the washer. The moving system needs to have some degree of movement relative to the support structure to permit the system to respond to forces generated during the agitation and spin operations of the machine. At the same time it is necessary to damp the motion, particularly during spin to prevent excess travel of the moving system.

Numerous different systems having been used to damp the motion of the moving system. For example, U.S. Pat. No. 5,606,879 to Froelicher et al. discloses a washer having a plurality of suspension rods supporting the moving system of the washer. Each suspension rod assembly includes a damping system comprising a piston connected to the lower free end of the rod which frictionally moves within a cylinder which engages the hung frame of the washer.

U.S. Pat. No. 5,117,659 to Sharp et al. discloses a washer in which a plurality of suspension rods having lower free ends are resiliently connected by a coiled spring to a floating frame. The coiled springs surround each rod below the frame, and transfers the weight of the moving system to the rod. Relative sliding movement of each of the rods in a axial direction is damped by friction bushings. The friction bushings comprise a collet fitted over the rods above the spring and under the frame and which frictionally engage the rod to retard the movement of the moving system.

SUMMARY OF THE INVENTION

The present invention provides an improved suspension system for a washer including an improved damping system for damping movement of the moving system relative to a stationary support structure.

The present invention further provides a spring/damping system which is relatively inexpensive and easily assembled. Moreover, the friction element, which may be subject to wear during the life of the washer, may be replaced without having to remove the entire spring/damping assembly from the suspension rod.

In accordance with the present invention, an automatic washer has a plurality of suspension rod assemblies for hanging a moving system of a washing machine from a stationary support structure. Each of the suspension rod assemblies include a rod having an upper end engaging the stationary support structure and having a lower end. An end cap is mounted to the lower end of the rod. A spring is arranged coaxially around the rod, having a bottom end abutting the end cap and extending upwardly to a upper end. A tubular cup is provided about the rod abutting the upper end of the spring. The cup includes a cylindrical wall with an open top end and a transverse wall at the other end. The cylindrical wall is disposed about the rod such that an elongated annular cavity is formed between the rod and the cylindrical wall. The transverse wall has an axial opening for insertion of the rod therethrough. A compressible friction member is disposed within the elongated annular cavity and is radially compressed between the cylindrical wall and rod for frictionally engaging the rod. The compressible friction member is preferably formed from a rectangular sheet of foam material which is wrapped about the rod such that it is configured into a hollow cylindrical body having an axial gap or slit. A cap mounts above the open top end of the tubular cup for capturing the compressible friction member between the cap and the tubular cup. The cap supportably engages the moving system such that rod is resiliently connected to the floating frame.

Each suspension rod assembly may further include a friction tube disposed about the lower portion of the rod and having a flanged bottom edge adjacent the lower end of the rod. The end cap comprises a washer and retainer assembled together wherein the flanged bottom edge of the friction tube is captured between the retainer and washer. The friction tube extends upwardly about the rod such that the cup is disposed about the friction tube and the friction member frictionally engages the outer surface of the friction tube.

In an alternative embodiment, the friction member for damping the movement of the moving system may comprises a friction member disposed within the elongated annular cavity of the cup and wherein the friction member has a tubular main body wrapped about the rod. A damper spring is disposed within the elongated annular cavity for biasing the tubular main body against the rod. More particularly, the movement of the moving system may be damped by a top friction members disposed within the elongated annular cavity and a bottom friction member disposed within the elongated annular cavity wherein each of the friction members has a tubular main body wrapped about the rod and a plurality of outwardly extending radial fins, the fins having angled top and bottom edges. The damper spring is disposed between the friction members and engages the bottom angled edges of the top friction member and the top angled edges of the bottom friction member such that the tubular main body of each friction member is compressed about the rod.

BRIEF DESCRIPTION OF THE DRAWINGS

FIG. 3 is an cross-sectional view of the spring/damping system of the suspension rod assembly of FIG. 2.

FIG. 4 is a sectional view taken along line IV—IV of FIG. 3.

DESCRIPTION OF THE PREFERRED EMBODIMENTS

Figure 1:
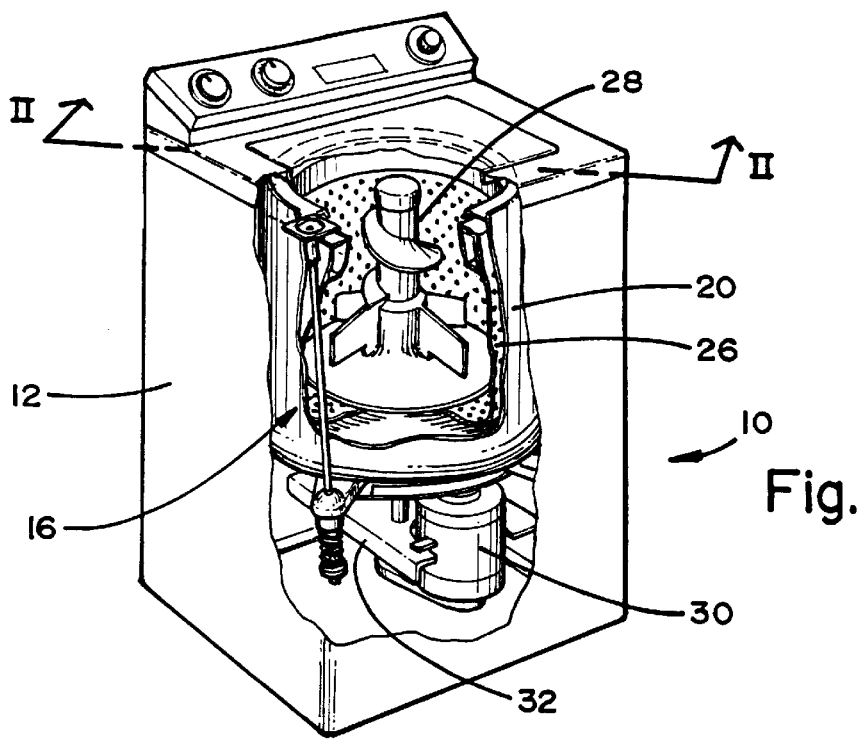
FIG. 1 is a fragmentary perspective view of a washing machine incorporating one embodiment of the invention.
Figure 2:
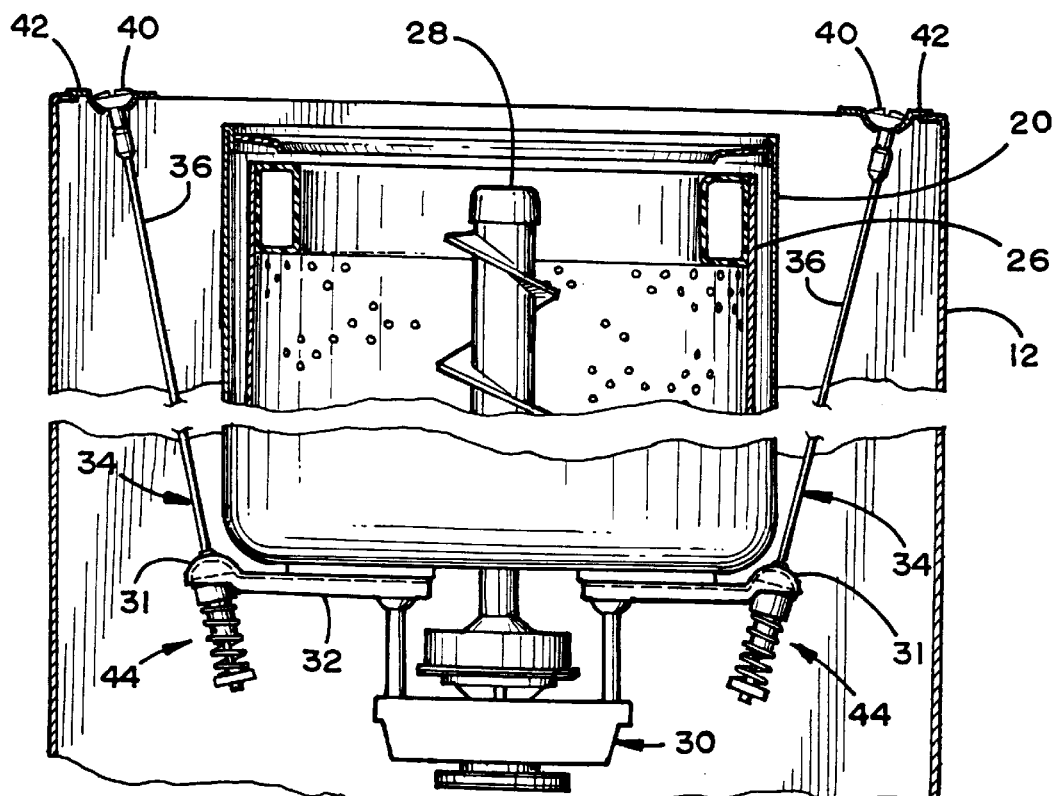
FIG. 2 is a partial sectional view taken along line II—II of FIG. 1.

FIGS. 1 and 2 show a washing machine generally a 10 comprising a cabinet 12 forming a stationary support structure 14 from which is suspended a moving system 16. The moving system 16 includes a wash tub 20, wash basket 26, drive system 30 and floating frame 32. The clothes basket 26 is mounted coaxially within the tub 20 and within the clothes basket 26 is mounted a vertical axis agitator 28. The clothes basket 26 and the agitator 28 are selectively driven by the drive system arrangement 30 which typically includes a transmission and motor supported below the wash tub 20. The floating frame 32 provides a structure for supporting the various components of the moving system 16 including the tub 20, basket 26 and drive system 30. The frame 32 includes a plurality of sockets 31 which engage a plurality of suspension rod assemblies 34 for connecting the floating frame 32 to the support structure 14 such that the moving system 16 is resiliently suspended within the cabinet 12. Preferably there are four suspension rod assemblies which are identical in construction. Only one suspension rod assembly will be described below.

Each of the suspension rod assemblies 34 include a rod 36 having an upper end 36a and a lower end 36b (see FIG. 3). The upper end 36a may be joined to a ball support 40 which is supported in a semi-spherical depression of a support bracket 42. The bracket 42 may be connected directly to the cabinet 12 or may be part of an upper frame assembly provided about the upper periphery of the cabinet 12. The rod 36 extends downwardly from the ball support 40 and passes through one of the sockets 31 extending from the frame 32 such that the lower end 36b is disposed below the socket 31. A spring/damper system 44, provided between the socket 31 and the lower end 36b, connects the lower end 36b to the socket 31.

FIGS. 3 and 4 shows in more detail the suspension rod assembly 34 and in particular the spring damper system 44. Mounted to the lower end 36b of the rod is an end cap assembly 64. The end cap assembly 64 includes an annular retainer member 68 which snap connects to a circular washer 66 via snap prongs 70. The washer 66 has a central opening 72 through which the rod 36 extends. The lower end 36b of the rod 36 is expanded or coined to have a dimension larger than the opening 72 such that the washer 66 can not pass over the lower end 36b.

A friction tube 48 is provided at the lower portion of the rod 36. The friction tube 48 includes a inwardly radiused upper end 50 and a flanged bottom edge 52. The flanged bottom edge 52 of the friction tube 48 is captured between the retainer 68 and the washer 66 such that the friction tube extends upwardly from the end cap assembly 64 about the rod 36.

A spring 74 extending coaxially about the friction tube 48 is disposed above the end cap assembly 64 and has a bottom end contacting the end cap assembly 64. A tubular cup 54 is provided about the friction tube 48 and is resiliently supported by the spring 74. The cup 54 includes a cylindrical wall 56 which forms a hollow cylinder about the friction tube such than an elongated, annular cavity 55 is formed between the cylindrical wall 56 and the friction tube 48. The hollow cylinder formed by the cylindrical wall 56 has an open top end 57 while a transverse wall 58 extends across and substantially closes the bottom of the cylindrical wall 56. An axial opening 60 is provided in the transverse wall 58 at the center axis of the cylindrical wall through which the rod 36 and friction tube 48 extend.

A compressible friction member 78 is disposed within the annular cavity 55 formed between the cylindrical wall 56 and the friction tube 48. The frictional member 78 is radially compressed between the cylindrical wall 56 and the friction tube 48 such that the friction member 78 frictionally engages the friction tube wherein relative motion between the friction tube 48 and the friction member 78 is damped.

The friction member 78 is preferably an open celled foam member which is impregnated with oil and more particularly is preferably formed from a flat, rectangularly shaped sheet of open celled foam material. The sheets of foam material which form the friction member 78 are sliced from a molded block of foam such that the planar surfaces of the friction member are semi-permeable as compared to an impermeable, skin-like surface which would be present on a molded foam part. The semi-permeable surface of the friction member 78 allow for oil to be readily impregnated into the friction member 78. Using foam sheets for the friction member 78 provides the further benefit of uniformity from one friction member to another. In particular, the sheet construction provides for very consistent thickness and compressive properties such that a consistent and predictable damping force can be achieved.

During assembly of the spring/damper assembly 44, the foam sheet is folded over and inserted into the cylindrical cavity formed within the cylindrical wall 56. Subsequent insertion of the friction tube 48 up through the axial opening 60 causes the friction member 78 to fit within the elongated annular cavity 55 formed between the friction tube 48 and the cylindrical wall 56. When assembled between the friction tube 48 and cylindrical wall 56, the friction member is arranged into a tube-like configuration having an axial slit or gap 79.

A cap 80 is positioned above the open top end 57 of the cup 54. The cap 80 includes a semi-spherical upper surface 82 which is received up into the socket 31 for supportably engaging the floating frame 30. The cap 80 also includes a depending, annular rib 84 which extends into the open top end 57 and engages the top edge of the friction member 78 for axially compressing the friction member 78. This axial compression of the friction member 78 ensures that relative motion between the cap 80 and the friction tube 48 results in corresponding movement between the friction member 78 and the friction tube 48. Without this positive engagement between the cap 80 and the friction member 48, there may exist axial clearance between the ends of the friction member 78 and the cap 80 and the transverse wall 58. Such an axial clearance would allow the friction member 78 to move axially within the annular cavity avoiding frictional sliding against the friction tube 48 during small amplitude vibrations thereby precluding effective damping of small amplitude motion.

It can be understood, therefore, that the weight of the moving system 16 is transferred through the socket 31 to the cap 80. This load is transferred through the friction member 78 to the cup 54, through the spring 74 to the end cap assembly 64 which is mounted to the bottom end 36b of the rod 36. The spring 74 provides for a resilient connection between the moving system 16 and the support structure 14 such that the moving system is supported in a manner to allow relative movement between the moving system 16 and the support structure 14. A bumper spring 86 may also be provided extending from an annular slot 88 on the retainer 68. The bumper spring 86 provides the spring/damper system 44 with a two stage operation such that during large amplitude movement of the moving system 16, the bumper spring 86 engages the bottom surface of the cup 56 and is compressed along with the spring 74 thereby reducing the likelihood that the spring/damper system 44 will bottom out.

The motion of the moving system 16 results in relative motion between the friction tube 48 and friction member 78 such that the motion is frictionally damped by the frictional engagement between the friction member 78 and the friction tube 48. The friction tube 48 has a predetermined diameter such that the surface area of contact between the friction tube 48 and the friction member 78 is sufficient to achieve the necessary frictional resistance for a given compression while minimizing the height H of the frictional member 78. Heat transfer away from the interface between the friction member 78 and the friction tube is improved by the use of a friction member having a relatively small height H dimension. Additionally, the friction tube 48 must have a wall thickness sufficient to adequately transfer heat.

Figure 5:
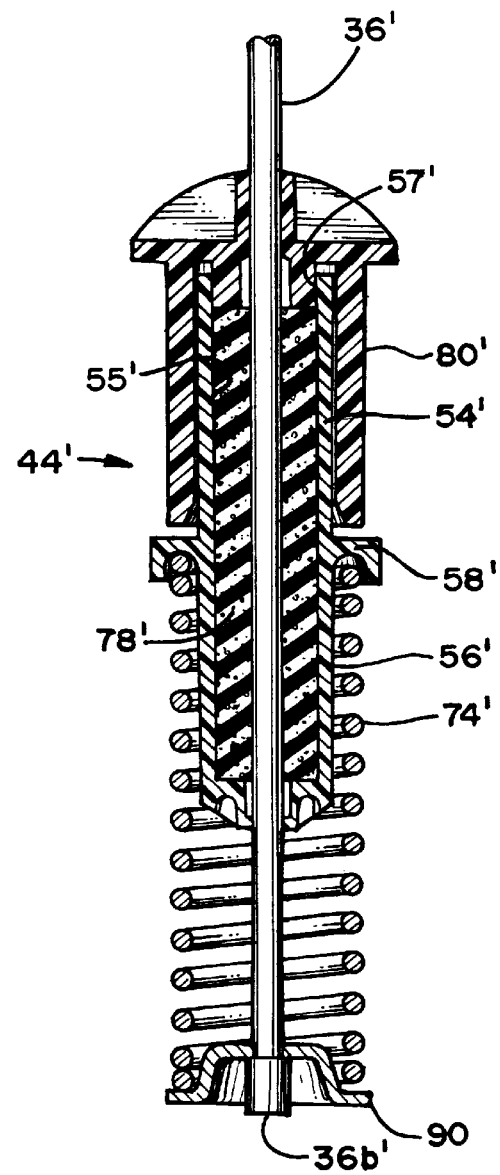
FIG. 5 is an cross-sectional view of a second embodiment of the suspension rod assembly and in particular the spring/damping system of the present invention.

FIG. 5 illustrates a second embodiment of the present invention wherein a suspension rod assembly 34' has a spring/damper system 44' which does not include a friction tube. The spring damper system 44' has an end cap which simply comprises a stamped washer 90 mounted to the lower end 36b' of the rod 36'. A spring 74' extends upwardly about the rod 36' and contacts a cup 54'. The cup 54' includes a cylindrical wall 56' disposed about the rod 36' such that an elongated annular cavity 55' having an open top end 57' is formed between the cylindrical wall 56' and the rod 36'. A transverse wall 58' is provided at one end of the cylindrical wall 56'.

A friction member 78' is inserted into the elongated, annular cavity 55'. The frictional member 78' is radially compressed between the cylindrical wall 56' and the rod 36' such that the friction member 78' frictionally engages the rod 36' wherein relative motion between the rod 36' and the friction member 78' is damped. A cap 80' is positioned above the open top end 57' of the cup 54'. The cap 80' includes a semi-spherical upper surface 82' which is received up into the socket 31' for supportably engaging the floating frame 30'. The cap 80' also includes a depending, annular rib 84' which extends into the open top end 57' and engages the top edge of the friction member 78' for axially compressing the friction member 78'.

The second embodiment offers some benefits as well as some disadvantages as compared to the first embodiment. The primary benefit of the second embodiment is cost-utilizing a stamped washer 90 for the end cap and omitting the use of a friction tube. The disadvantages include more difficult assembly and the necessity of using a friction member 78' which has a relatively large H' dimension which impairs effective heat transfer away from the interface between the rod 36' and the friction member 78'.

Figure 7:
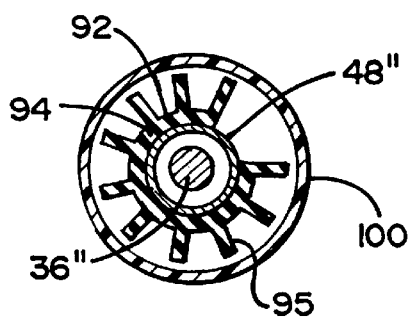
FIG. 7 is a sectional view taken along line VII—VII of FIG. 6.
Figure 6:
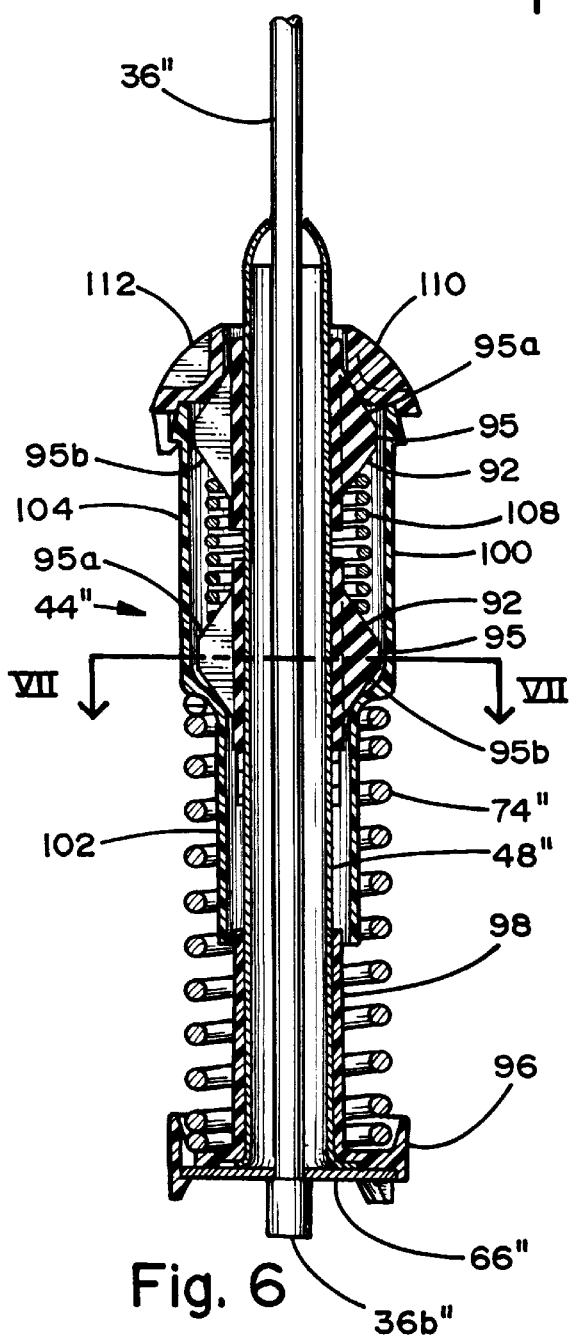
FIG. 6 is an cross-sectional view of a third embodiment of the suspension rod assembly and in particular the spring/damping system of the present invention.

FIG. 6 and 7 illustrates a third embodiment of the present invention wherein a suspension rod assembly 34" has a spring/damper system 44" which employs a pair of spring biased frictional members 92.

The spring damper system 44" has an end cap including a retainer 96 and a washer 66" mounted to the lower end 36b" of the rod 36". A friction tube 48" is provide in a similar manner to the first embodiment and the retainer 96 includes a sleeve 98 which extends upwardly about the friction tube 48". A spring 74" extends about the rod 36" and contacts a tubular cup 100. The cup 100 defines a tube having a first diameter portion formed by a lower cylindrical wall 102 and a second, larger diameter portion formed by an upper cylindrical wall 104. The lower and upper cylindrical walls 102, 104 are joined by a radiused wall portion 106 which engages the upper end of the spring 74". The cup 100 is disposed about the friction tube 48" such that the upper cylindrical wall 102 forms an elongated annular cavity 55" having an open top end 57" between the upper cylindrical wall 102 and the friction tube 48".

The pair of identical friction members 92 are inserted into the elongated, annular cavity 55". The friction members 92 each comprise a hollow cylinder main body 94 and a plurality of outwardly extending, radial fins 95. The fins 95 include angled top and bottom edges 95a 95b. When disposed within the annular cavity 55", the friction member 92 are separated by a damper spring 108. The damper spring 108 engages the bottom angled edge 95b of the top friction member 92 and the top angled edge 95a of the bottom friction member 92. Accordingly, a component of the force applied by the damper spring 108 to the friction members 92 is normal to the axis of the friction tube 48" such that the inner surface of the main body 94 of each of the friction members 92 is pressed against the outer surface of the friction tube 48". In this manner, relative motion between the friction tube 48" and the friction members 92 is frictionally resisted such that the motion of the moving system 16" is damped.

A cap 110 is positioned above the open top end of the cup 100. The cap 110 includes a semi-spherical upper surface 112 which is received up into the socket 31" for supportably engaging the floating frame 30". The cap 110 snap connects to the cup 100 for capturing the friction members 92 within the annular cavity 55".

The spring/damper system 44" of the third embodiment is also provided with a two stage spring operation. During large amplitude movement of the moving system 16", the sleeve 98 engages the lower edge of the bottom friction member 92 such that the damper spring 108 is compressed along with the spring 74" thereby reducing the likelihood that the spring/damper system 44" will bottom out.

It can be seen, therefore, that the present invention provides for an easily assembled suspension rod assembly which includes a unique spring/damper system. While the present invention has been described with reference the above described embodiments, those of skill in the Art will recognize that changes may be made thereto without departing from the scope of the invention as set forth in the appended claims.

We claim:

1. A suspension rod assemnbly for hanging a moving system of a washing machine from a stationary support structure, the suspension rod assembly comprising:

a rod having an upper end engaging the stationary support structure and having a lower end;

an end cap mounted to the lower end of the rod;

a tubular cup including a cylindrical wall disposed about the rod above the end cap, the cylindrical wall defining an elongated annular cavity about the rod having an open top end;

a compressible friction member disposed within the elongated annular cavity defined by the cylindrical wall, the compressible friction member being a sheet of foam wrapped about the rod and configured into a hollow cylinder having an axial gap;

a cap positioned adjacent the open top for capturing the compressible friction member between the cap and the tubular cup; and a spring arranged coaxially around the rod, abutting at a first end the tubular cup and at a second end the end cap, wherein the cap supportably engages the moving system such that the lower end of the rod is resiliently connected to the moving system.

2. The suspension rod assembly according to claim 1, further wherein the sheet of foam forming the friction member is cut from a larger block of foam.

3. The suspension rod assembly according to claim 1, further comprising:

a washer mounted to the lower end of the rod;

an annular retainer disposed about the rod adjacent the washer wherein the washer and annular retainer form the end cap and the spring abuts at its second end the retainer; and a friction tube disposed about the rod and having a flanged bottom edge captured between the retainer and the washer, the friction tube extending upwardly through the tubular cup such that the friction member frictionally engages the friction tube.

4. The suspension rod assembly according to claim 1, wherein the cap compresses the friction member when the cap engages the moving system.

5. The suspension rod assembly according to claim 1, wherein the support of the moving system is transferred through the cap, to the compressible friction member, to the tubular cup, through the spring, to the end cap which is mounted to the lower end of the rod such that the lower end of the rod is resiliently connected to the moving system.

6. The suspension rod assembly according to claim 1, further comprising:

a bumper spring extending from the end cap toward the tubular cup wherein the bumper spring is compressed between the end cap and tubular cup upon large amplitude movements of the moving system.

7. A suspension rod assembly for hanging a moving system of a washing machine from a stationary support structure, the suspension rod assembly comprising:

a rod having an upper end engaging the stationary support structure and having a lower end;

a washer mounted to the lower end of the rod;

an annular retainer disposed about the rod adjacent the washer wherein the washer and annular retainer form an end cap;

a friction tube extending upwardly about the rod and having a flanged bottom edge captured between the retainer and the washer;

a tubular cup including a cylindrical wall disposed about the friction tube, the cylindrical wall defining an elongated annular cavity about the friction tube having an open top end;

a compressible friction member disposed within the elongated annular cavity formed between the cylindrical wall and the friction tube such that the friction member frictionally engages the friction tube;

a cap positioned adjacent the open top for capturing the compressible friction member between the cap and the tubular cup; and a spring arranged coaxially around the friction tube, abutting at a first end the tubular cup and at a second end the annular retainer, wherein the cap supportably engages the moving system such that the lower end of the rod is resiliently connected to the moving system.

8. The suspension rod assembly according to claim 7, further wherein the compressible friction member is a sheet of foam wrapped about the friction tube and configured into a hollow cylinder having an axial gap.

9. The suspension rod assembly according to claim 7, wherein the cap compresses the friction member when the cap engages the moving system.

10. The suspension rod assembly according to claim 7, wherein the support of the moving system is transferred through the cap, to the compressible friction member, to the tubular cup, through the compression spring, to the end cap which is mounted to the lower end of the rod such that the lower end of the rod is resiliently connected to the moving system.

11. The suspension rod assembly according to claim 7, further comprising:

a bumper spring extending from the annular cap toward the tubular cup wherein the bumper spring is compressed between the annular retainer and tubular cup upon large amplitude movements of the moving system.

\* \* \* \* \*